US010521517B2

(12) United States Patent
Benjamin et al.

(10) Patent No.: US 10,521,517 B2
(45) Date of Patent: Dec. 31, 2019

(54) DESIGNING OBJECTS USING LATTICE STRUCTURE OPTIMIZATION

(71) Applicant: AUTODESK, INC., San Rafael, CA (US)

(72) Inventors: David Benjamin, New York, NY (US); Danil Nagy, New York, NY (US); Dale Zhao, Brooklyn, NY (US)

(73) Assignee: AUTODESK, INC., San Rafael, CA (US)

( * ) Notice: Subject to any disclaimer, the term of this patent is extended or adjusted under 35 U.S.C. 154(b) by 486 days.

(21) Appl. No.: 15/040,813

(22) Filed: Feb. 10, 2016

(65) Prior Publication Data
US 2017/0228474 A1 Aug. 10, 2017

(51) Int. Cl.
*G06F 17/50* (2006.01)

(52) U.S. Cl.
CPC .......... *G06F 17/50* (2013.01); *G06F 17/5018* (2013.01); *G06F 17/5095* (2013.01); *G06F 2217/08* (2013.01)

(58) Field of Classification Search
CPC ....................................................... G06F 17/50
USPC .............................................................. 703/1
See application file for complete search history.

(56) References Cited

U.S. PATENT DOCUMENTS

| | | | |
|---|---|---|---|
| 2001/0005204 A1 | 6/2001 | Matsumoto et al. | |
| 2004/0039470 A1 | 2/2004 | Gervasi et al. | |
| 2005/0108252 A1* | 5/2005 | Pfaltz | G06F 17/30539 |
| 2006/0262112 A1 | 11/2006 | Shimada | |
| 2008/0122856 A1 | 5/2008 | Boyd et al. | |
| 2010/0262406 A1* | 10/2010 | Goel | G06F 17/5018 703/2 |
| 2010/0284607 A1* | 11/2010 | Van Den Hengel | G06T 7/564 382/154 |
| 2013/0264749 A1 | 10/2013 | Jones et al. | |
| 2014/0037873 A1* | 2/2014 | Cheung | B32B 3/06 428/34.1 |

(Continued)

FOREIGN PATENT DOCUMENTS

WO 2011/095980 A1 8/2011

OTHER PUBLICATIONS

Seok-Ho Yoon, Ki-Nam Kim, Jiwon Hong, Sang-Wook Ki, Sunju Park; A community-based sampling method using DPL for online social networks Elsevier Information Sciences 306, Feb. 12, 2015, pp. 53-69.*

(Continued)

*Primary Examiner* — Dwin M Craig
(74) *Attorney, Agent, or Firm* — Artegis Law Group, LLP

(57) ABSTRACT

A design engine for designing an object using structural analysis. The design engine generates a lattice structure for the object comprising a plurality of nodes and a plurality of lines connecting the nodes. The lattice structure is optimized to remove one or more lines using structural analysis based on at least one load-related design requirement. Several design options are provided for generating and optimizing the lattice structure. The design engine then generates a 3D model of the object by thickening each line of the lattice structure into a pipe volume. The thickness of each pipe is determined using structural analysis based on the at least one load-related design requirement. The 3D model represents the volume of the object and is exportable to a fabrication device.

20 Claims, 10 Drawing Sheets

(56) References Cited

U.S. PATENT DOCUMENTS

| | | | |
|---|---|---|---|
| 2014/0199175 A1* | 7/2014 | Godfrey | F01D 5/14 416/241 R |
| 2015/0190971 A1* | 7/2015 | Musuvathy | B29C 64/386 700/98 |
| 2015/0193559 A1 | 7/2015 | Musuvathy | |

OTHER PUBLICATIONS

Ben Adlam, Marton A. Nowak, "Universality of fixation probabilities in randomly strucured populations" Scientific Reports Punlished Oct. 27, 2014, 6 pages.*
J. Nguyen, Sand-in Park, David Rosen, "Conformal lattice structural design and fabrication" School of Mechanical Engineering Georgia Institute of Technology, Paramount Industries, pp. 138-161, 2012.*
Freund, "Truss Design and Convex Optimization", Massachusetts Institute of Technology, Apr. 13, 2004, 47 pages.
Ohsaki, et al., "Topology and Geometry Optimization of Trusses and Frames", Recent Advances in Optimal Structural Design, 2002, pp. 97-123.
International Search Report for International Application No. PCT/US2016/067949 dated Feb. 24, 2017.
Extended European Search Report for application No. 16890116.3 dated Aug. 9, 2019.
Alzahrani et al., "Design of Truss-like Cellular Structures using Relative Density Mapping Method", Materials and Design, vol. 85, Nov. 1, 2015, pp. 349-360.
Chahine et al., "Application of Topology Optimization in Modem Additive Manufacturing", Solid Freeform fabrication Symposium URL:http://sffsymposium.engr.utexas.edu/Manuscripts/2010/2010-51-Chahine.pdf, Jan. 1, 2010, pp. 506-618.

* cited by examiner

DESIGNING OBJECTS USING LATTICE STRUCTURE OPTIMIZATION

BACKGROUND OF THE INVENTION

Field of the Invention

The present invention generally relates to computer science and, more specifically, to designing objects using structural optimization.

Description of the Related Art

Designers use computer-aided design (CAD) systems to assist in developing solutions to design problem statements. Among other things, CAD systems provide complex functions to support design modeling and produce different design solutions that satisfy the requirements of the design problem statement. CAD systems for designing/modeling objects based on structural analysis have become particularly popular. Structural analysis typically involves implementing one or more topology optimization algorithms to produce optimized designs based on structural performance (such as load-based parameters) of the designs.

Topology optimization typically includes processing an initial three-dimensional (3D) model of an object that represents a maximum volume of the object in terms of the amount of material needed to manufacture the object. During such operations, volume/material is removed from or added to the 3D model based on a structural analysis of the 3D model. More specifically, a simulation of the flow of forces through the maximum volume is produced, and based on how the forces are distributed throughout the maximum volume, the topology optimization algorithm progressively removes volume/material from areas of the maximum volume having the least amount of stress, while also adding volume/material to areas of the maximum volume having greater amounts of stress. Topology optimization may be implemented via finite element analysis (FEA) algorithms to create accurate simulations of how forces are distributed throughout a volume and of the resulting deformations and stresses present within the volume. In this fashion, topology optimization may be used to generate optimized designs that have as little volume/material as possible while maintaining a level of structural integrity that satisfies the design problem statement.

The growing popularity of topology optimization has also come as a result of recent developments in manufacturing technology. In particular, additive layer manufacturing (ALM) or 3D printing has made possible the fabrication of complex geometries that often result from the topology optimization process. In addition, the development of metal-based 3D printing technology, such as selective laser sintering (SLS), has pushed 3D printing from the realm of prototypes into the realm of manufacturing actual useable parts.

One drawback of topology optimization is that the process is highly inflexible and deterministic. Consequently, the same design problem statement oftentimes produces the same or very similar design solutions, which limits the ability to explore a wide space of possible design solutions. Another drawback of topology optimization is that the process of removing or adding volume/material to the 3D model to generate a final design that is ready for 3D printing is both time and resource intensive. Among other things, the process can be quite iterative and can require the 3D model to be generated, analyzed, and modified multiple times, which consumes both time and computational resources. A further drawback of topology optimization is that it often results in a 3D model that is inadequate for ALM without intensive manual processing.

As the foregoing illustrates, there is a need in the art for more effective ways to use structural analysis to design objects via CAD systems.

SUMMARY OF THE INVENTION

Various embodiments of the invention includes a computer-implemented method for designing an object. The method includes generating a lattice structure representing the object and comprising a plurality of interconnected lines. The lattice structure may be generated and optimized using structural analysis based on at least one design requirement specified for the object. The method also includes generating a 3D model based on the lattice structure, the 3D model representing a volume of the object. The method includes providing several different design options when generating and optimizing the lattice structure.

At least one advantage of the disclosed technique is that it produces several different design options for a given design problem statement, which results in a wider design solution space relative to conventional approaches.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The following description is divided into three sections. Section I describes a design environment for modeling/designing an object using lattice structure optimization. Section II describes techniques for generating a lattice structure representing the object. Section III describes techniques for generating a 3D model of the object based on the lattice structure.

Design Environment

Figure 1:
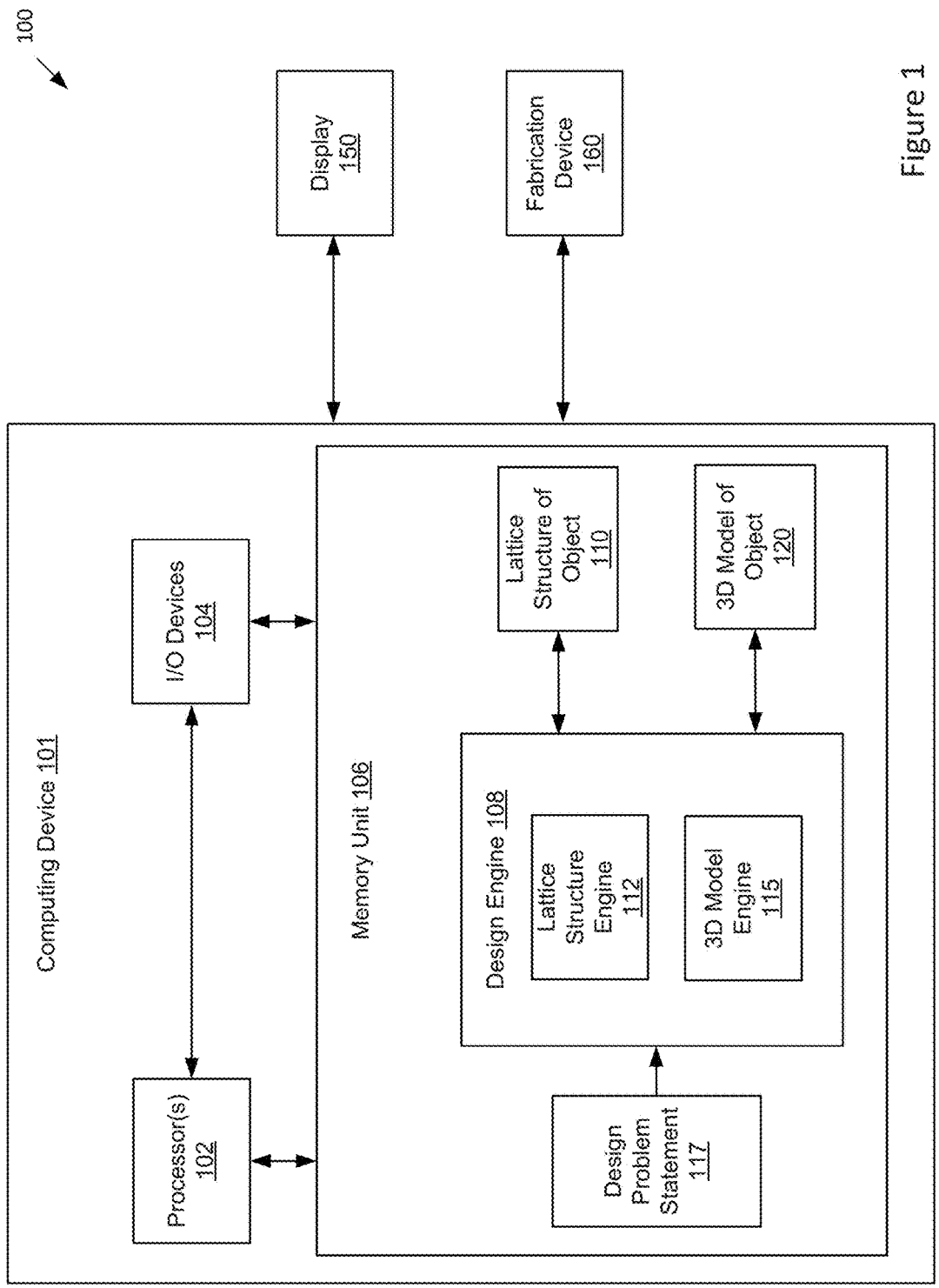
FIG. 1 illustrates a design environment configured to implement one or more aspects of the present invention.

FIG. 1 illustrates a design environment 100 configured to implement one or more aspects of the present invention. The design environment 100 comprises an environment for modeling/designing an object using lattice structure optimization. As shown, the design environment 100 includes a computing device 101 comprising a processor 102 coupled to input/output (I/O) devices 104 and to a memory 106. The memory 106 may comprise a design engine 108 (comprising a lattice structure engine 112 and a 3D model engine 115), a design problem statement 117, lattice structure of an object 110, and a 3D model of an object 120.

The computing device 101 may comprise a server, personal computer, laptop or tablet computer, mobile computing device, or any other device suitable for practicing various embodiments described herein. Processor 102 may be a central processor (CPU), a graphics processor (GPU), an application-specific integrated circuit (ASIC), a field-programmable gate array (FPGA), and so forth. Processor 102 may also be a combination of different processors, such as a CPU configured to operate in conjunction with a GPU, or many CPUs configured to work together through cloud computing. In general, processor 102 may be any technically feasible form of processing device configured to process data and execute program code. The processor 102 executes software and performs the functions and operations described herein.

I/O devices 104 are also coupled to memory 106 and may include devices capable of receiving input, such as a keyboard, a mouse, a trackball, and so forth, as well as devices capable of providing output, such as a display, speaker, and so forth. Additionally, I/O devices may include devices capable of both receiving input and providing output, such as a touchscreen, a universal serial bus (USB) port, and so forth. I/O devices 104 may be configured to receive various types of input from an end-user of the design environment 100, and to also provide various types of output to the end-user of design environment 100. In particular, the I/O devices may further include a display monitor 150 and a fabrication device 160.

The display monitor 150 may display visual feedback to the user to assist in the design and modeling of the object. The visual feedback that is displayed on the display monitor 150 may include images and/or video showing the lattice structure of the object 110 and/or 3D model of the object 120, as well as any updates/modifications that are made to the lattice structure 110 and/or 3D model 120 during the design process.

A fabrication device 160 may comprise any device capable of fabricating/producing the physical object. The design engine 108 may export a 3D model of the object 120 (comprising a 3D printable design) to the fabrication device 160, which produces a physical 3D object based on the 3D model 120. For example, the fabrication device 160 may comprise a 3D printer, fuse-deposition modeling (FDM) printer, stereolithography (SLA) printer, metal-based 3D printers (such as a selective laser sintering printer), laser cutter, router, or any CNC machine capable of producing physical 3D objects using one or more different materials. For example, materials used to print objects may include metals, ABS plastic, polylactic acid (PLA) plastic, resin, nylon, rubber, or any other suitable material. The fabrication device 160 may use a variety of additive manufacturing technologies (such as additive layer manufacturing) to create a 3D object by building it in successive layers until the object is complete.

The object may comprise any item or article that may be digitally designed and manufactured. In some embodiments, the object comprises an object to be used to support a specified load. Several fabrication spaces may specifically benefit from digital design of objects supporting a load, such as objects used in automobile, ship, and aircraft industries. However, any type of object used for supporting a load may be designed in accordance with various embodiments described herein.

Memory 106 is configured to store data and may include a hard disk, a random access memory (RAM) module, a flash memory unit, or any other type of memory unit or combination thereof. Processor 102 and I/O devices are configured to read data from and write data to memory 106. Memory 106 includes a design engine 108 comprising an lattice structure engine 112 and a 3D model engine 115. The design engine 108 may also comprise various applications and engines (such as a rendering application/engine, computer-aided design (CAD) application, computer-aided engineering (CAE) application, simulator application, modeler application, geometry generator application, or the like) to perform the functions and operations described herein. Memory 106 also includes a design problem statement 117, lattice structure of an object 110, and a 3D model of an object 120.

The design engine 108 may receive the design problem statement 117 from a user/designer (e.g., via keyboard or microphone) or from another application. In general, the design problem statement 117 describes a design problem and specifies goals and intentions of a design solution for the design problem. The design problem statement 117 comprises a set of one or more design requirements that each design solution must satisfy and a definition of the design space for the object. The design problem statement 117 may specify different types of design requirements, each type of requirement describing a different aspect of the design problem and/or design solution. Examples of different types of design requirements include function, objective, constraint, environment interaction, and load-related requirements. The performance of a design solution may be measured by how well the design solution satisfies its function requirement(s) while meeting all other specified requirements.

A "function" requirement may describe the functional requirements of the design solution, the intended purpose of the design solution, and/or what the design solution should do. For example, a function requirement may specify that "a bracket is to support a shelf." An "objective" requirement may specify a property in the design solution to be maximized or minimized. Thus, an objective requirement may specify optimizations for the design solution and include measurable criteria for evaluating the effectiveness of the design solution (how well the design solution solves the design problem). For example, an objective requirement may specify that "an objective is to minimize the weight of the bracket." A "constraint" requirement may specify a limit on a property of the design solution that the design solution must not violate. Thus, a constraint requirement sets a quantifiable limit of a property that the design solution cannot exceed. For example, a constraint requirement may specify that "the bracket cannot be wider than 3 cm." An "environment interaction" requirement may specify a relationship between two objects interacting in an environment, including locations where the object is fixed because it is connected to other parts, such as a welding point or a bolt. For example, an environment interaction requirement may specify that "the shelf is located 2 m above the ground."

In some embodiments, the design problem statement 117 specifies at least one load-related requirement. A "load" requirement may specify any load-related metric/property that is to be satisfied by a design solution. For example, a load-related requirement may specify that "the object must support a load of 50 kg." Examples of load-related metrics/properties that may be specified in a load-related requirement include weight (e.g., amount of weight to be supported), force, stress, deformation, displacement, and the like. When specifying a force metric, the load-related requirement may specify both the magnitude/amount of force and the direction of force that is to be supported by or applied to the object. When specifying a stress metric, the load-related requirement may specify the amount of internal force to be supported by or applied to the object. Deformation (strain) refers to any changes in the shape or size of the object due to an applied force or stress. When specifying a deformation metric, the load-related requirement may specify the maximum amount of object deformation that is permitted. Displacement refers to a distance and direction of motion of the object caused by a load applied to the object. When specifying a displacement metric, the load-related requirement may specify the maximum amount of object displacement that is permitted. A load (such as a weight or force) applied to an object may cause stresses, deformations, and/or displacements in object. Assessment of these effects on the object may be determined using structural analysis of the object.

As mentioned above, the design problem statement 117 also includes a definition of the design space for the object. The definition of the design space may specify a 3D space or volume that comprises the entirety of locations where the design solution for the object is permitted to occupy. By corollary, no portion of the design solution for the object is permitted to occupy any location outside of the specified 3D space. For example, the definition of the design space may specify a particular cylindrical volume within which the entire design solution for the object must be located. The definition of the design space may also be referred to as the bounding volume or boundary information for the design solutions.

In general, the design engine 108 may receive the design problem statement 117 for an object and produce at least one design solution that meets all design requirements (including at least one load-related requirement) of the design problem statement. The design engine 108 may do so by first generating and optimizing a lattice structure of the object 110 using the lattice structure engine 112. The design engine 108 may then generate a 3D model of the object 120 based on the lattice structure 110 using the 3D model engine 115, the 3D model of the object 120 comprising a design solution that satisfies all design requirements of the design problem statement.

The lattice structure engine 112 generates the lattice structure of the object 110 which comprises a mathematical representation of the object. In some embodiments, the lattice structure 110 comprises a plurality of nodes that are interconnected by a plurality of lines (beams). The lattice structure 110 may comprise a 3D space. A line comprises a two-dimensional (2D) element of the lattice structure 110 and a line does not have a volume. As such, each line is specified as a 2D element and not as a 3D volume in the lattice structure 110. Although each line comprises a 2D element, each line may have associated 3D coordinates (e.g., x, y, z coordinates) that specify the location/position of the line within the 3D lattice structure 110.

Figure 2:
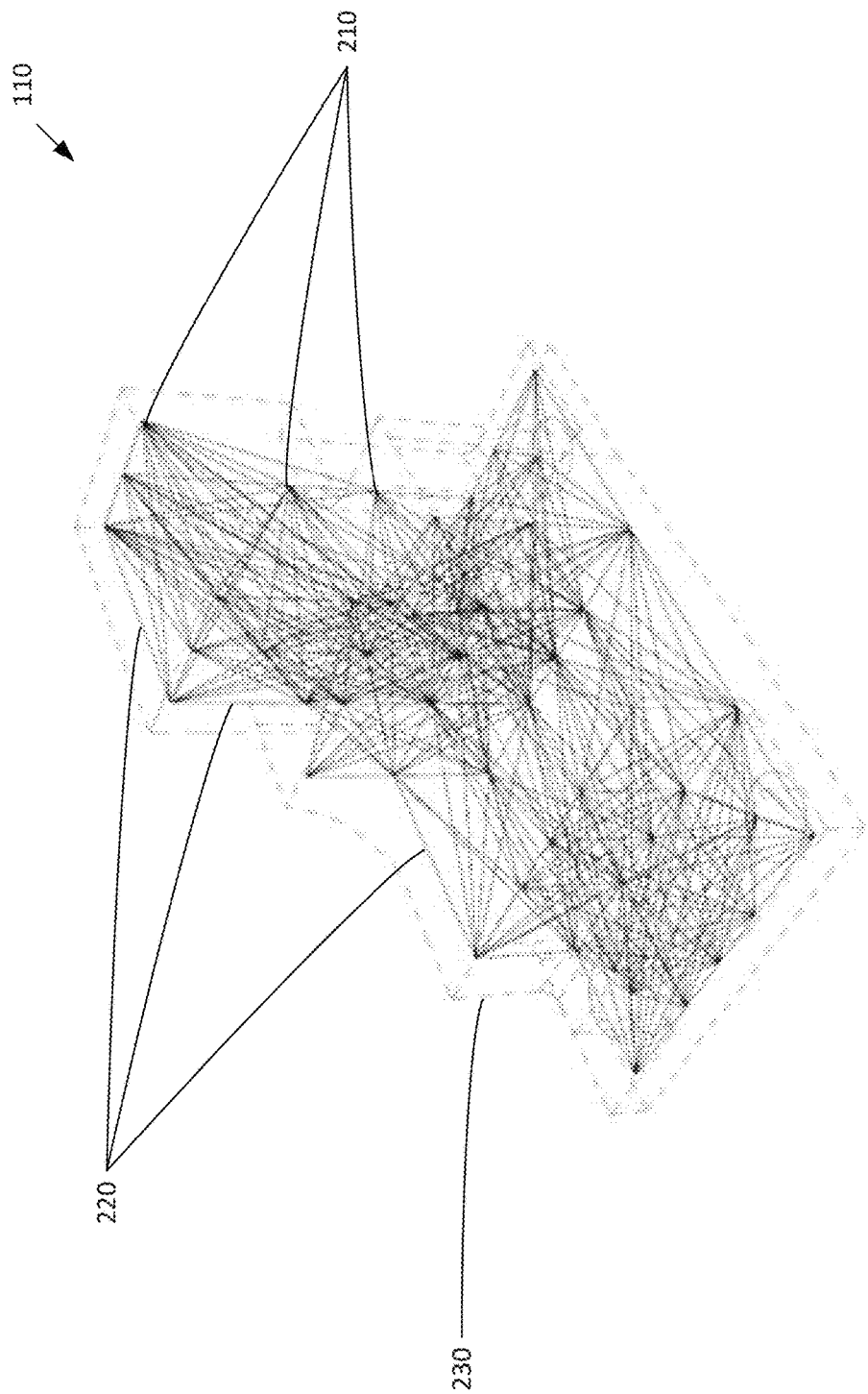
FIG. 2 shows a conceptual diagram of a lattice structure of an object, according to various embodiments of the present invention.

FIG. 2 shows a conceptual diagram of a lattice structure of an object 110, according to various embodiments of the present invention. As shown, the lattice structure 110 comprises a plurality of nodes 210 (represented as black dots) that are interconnected by a plurality of lines 220. Also shown is a 3D design space 230 defined for the object (as specified in the design problem statement 117) that is represented by the dashed lines that outline a bounding volume within which the entire design solution for the object is to be located.

After the lattice structure 110 is generated, the lattice structure engine 112 then optimizes the lattice structure of the object 110 based on at least one load-related requirement (specified in the design problem statement 117) using structural analysis techniques. Optimization of the lattice structure of the object 110 may include an iterative process that removes and/or adds lines to the lattice structure 110 based on at least one load-related requirement and structural analysis of the lattice structure 110.

As described herein, the generation and optimization of the lattice structure 110 comprises an efficient design process that models interconnected 2D elements (lines) and does not involve the time and resource intensive use of 3D modeling of a volume. In addition, the lattice structure engine 112 provides several design options for generating and optimizing the lattice structure 110. The design options provide a non-deterministic design process that allows exploration of a larger number of design solutions, while also ensuring that each design solution meets the specified design requirements. The lattice structure engine 112 and lattice structure 110 are described in further detail in Section II.

The 3D model engine 115 then generates the 3D model of the object 120 based on the lattice structure of the object 110. In general, the 3D model 120 is generated by building out/thickening the lines of the lattice structure 110 so that each line has a diameter and volume. A line that has been thickened to have a diameter and volume has been converted into a "pipe." The 3D model 120 may therefore comprise a plurality of interconnected pipes. The 3D model engine 115 may determine the diameter and volume (thickness) of each pipe (in the plurality of pipes) using structural analysis of the lattice structure 110. For example, the 3D model engine 115 may determine the diameter and volume (thickness) of each pipe based on the load on the particular pipe. In this manner, the 2D elements (lines with no volume) of the lattice structure 110 are converted to 3D elements (pipes with volume) in the 3D model 120. After determining the pipe thickness of each line in the lattice structure 110, the 3D model engine 115 then merges the resulting plurality of pipes to form a single unified 3D volume structure. The unified 3D volume structure comprises the 3D model of the object 120 which comprises a mathematical representation of the volume of the object. For example, the 3D model 120 may comprise a polygonal or volumetric mesh, a point cloud, or a manifold, etc. However, the 3D model 120 may comprise any type of mathematical model that represents the surface and volume of the object within a three-dimensional (3D) environment.

Figure 3:
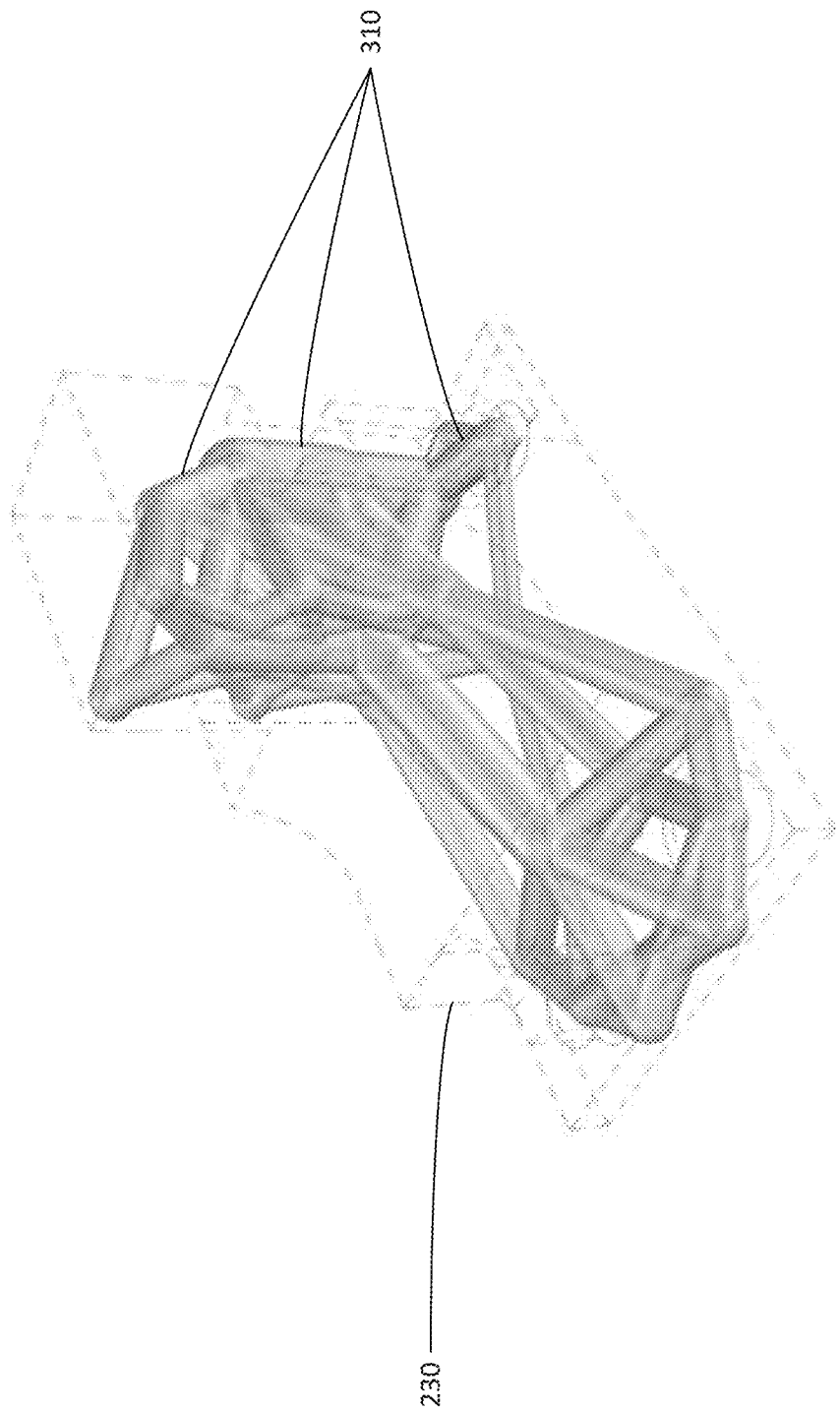
FIG. 3 shows a conceptual diagram of a 3D model of the object of FIG. 2, according to various embodiments of the present invention.

FIG. 3 shows a conceptual diagram of a 3D model of the object of FIG. 2, according to various embodiments of the present invention. The 3D model 120 is based on an optimized version of the lattice structure 110 shown in FIG. 2. Thus, the 3D model 120 shown in FIG. 3 is based on the lattice structure 110 shown in FIG. 2 after a plurality of lines 220 have been removed from the lattice structure 110 during the optimization process. As shown, the 3D model 120 comprises a plurality of interconnected 3D elements (pipes with volume) 310 that have been merged to form a single unified 3D volume structure. Each pipe 310 may comprise a line in the lattice structure 110 that has been thickened to comprise a diameter and volume. Also shown is the 3D design space 230 (bounding volume) defined for the object.

The 3D model 120 comprises a design solution for the design problem statement 117 and meets all design requirements (including at least one load-related requirement) specified in the design problem statement 117. The 3D model 120 also comprises a "workable solution" that is ready for exporting to a fabrication device 160 (e.g., 3D printer) for manufacture. The 3D model engine 115 and the 3D model of the object 120 are described in further detail in Section III.

Figure 4:
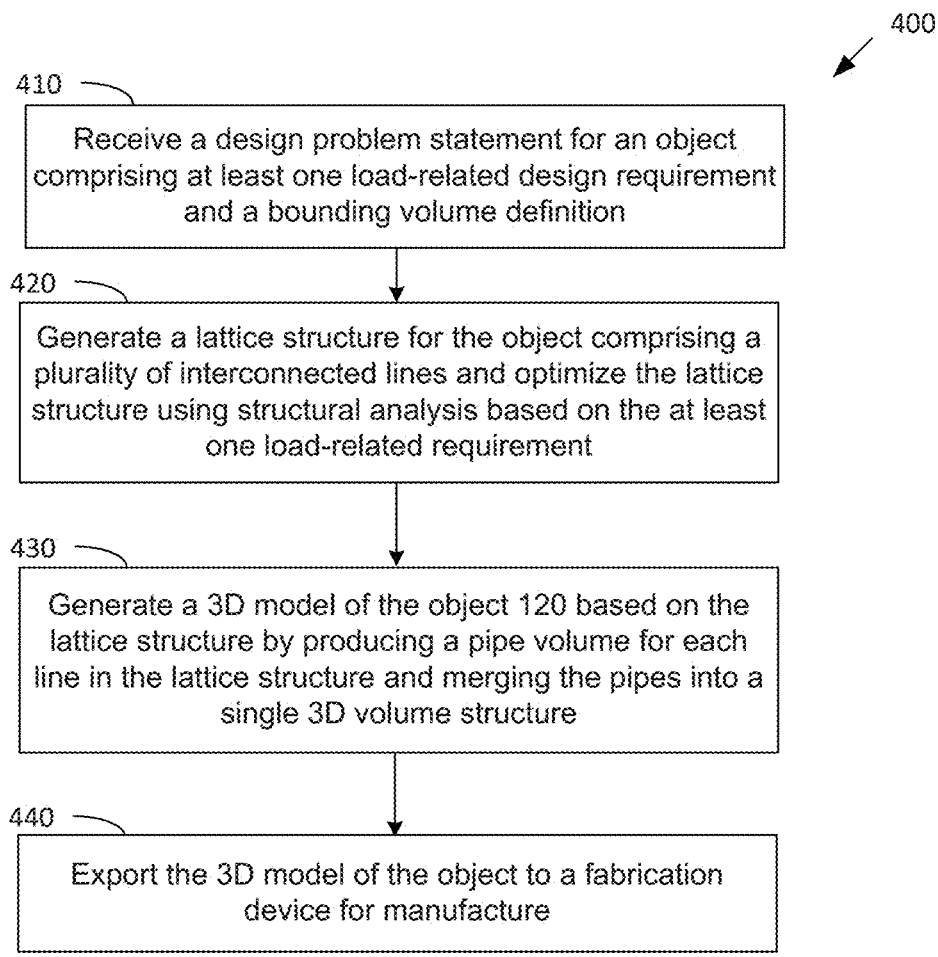
FIG. 4 illustrates a flow diagram of method steps for designing an object, according to various embodiments of the present invention.

FIG. 4 illustrates a flow diagram of method steps for designing an object, according to various embodiments of the present invention. Although the method steps are described in conjunction with the systems of FIGS. 1-3, persons skilled in the art will understand that any system configured to perform the method steps, in any order, is within the scope of the invention. In some embodiments, the method 400 may be performed when the design engine 108 is executed by the processor 102.

As shown, the method 400 begins when the design engine 108 receives (at step 410) a design problem statement 117 for an object, the design problem statement 117 comprising a set of one or more design requirements and a definition of the design space (bounding volume) for the object. In some embodiments, the design problem statement 117 includes at least one load-related requirement that specifies a load-related metric/property that is to be satisfied by the design solutions (such as metrics/properties related to weight, force, stress, deformation, displacement, and the like). For example, the design engine 108 may receive the design problem statement 117 from a user/designer (e.g., via keyboard or microphone) or from another application.

The lattice structure engine 112 then generates and optimizes (at step 420) a lattice structure 110 that represents the object. The lattice structure 110 may comprise a plurality of nodes 210 interconnected by a plurality of lines 220. The lattice structure 110 may be generated based on the design problem statement 117 and optimized using structural analysis based on at least one load-related requirement.

The 3D model engine 115 then generates (at step 430) a 3D model of the object 120 based on the lattice structure of the object 110. The 3D model 120 may be generated by thickening the lines of the lattice structure 110 so that each line comprises a pipe (3D element) with a diameter and volume. The 3D model engine 115 may then merge the resulting pipes to form a unified 3D volume structure that comprises the 3D model of the object 120 that represents the volume of the object. The design engine 108 then exports (at step 440) the 3D model 120 to a fabrication device 160, which fabricates a physical object based on the 3D model 120. The method 400 then ends.

Generating a Lattice Structure for an Object

The lattice structure engine 112 receives the design problem statement 117 for an object and generates and optimizes at least one lattice structure for the object 110 based on the design problem statement 117. The design problem statement 117 includes a set of design requirements (comprising at least one load-related requirement) and a definition of a 3D design space (bounding volume) for the object. In general, the lattice structure engine 112 generates the lattice structure 110 by: 1) generating a plurality of nodes based on the defined design space, 2) generating a plurality of lines connecting the plurality of nodes to produce the lattice structure 110, and 3) optimizing the lattice structure 110 by removing and/or adding lines to the lattice structure 110 based on at least one load-related requirement using structural analysis of the lattice structure 110.

The lattice structure engine 112 may generate node points within the defined design space according to various sampling methods (such as vertex-based sampling, edge-based sampling, surface-based sampling, and volume-based sampling of the design space). One or more sampling methods may be independently enabled/disabled to instantiate nodes within the defined design space based on the geometric features of the defined design space and the design requirements (as specific in the design problem statement 117). In some embodiments, the sampling methods are not mutually exclusive and two or more different types of sampling methods may be enabled at the same time, for example, to generate a first set of nodes according to a first sampling method and a second set of nodes according to a second sampling method.

Figure 5:
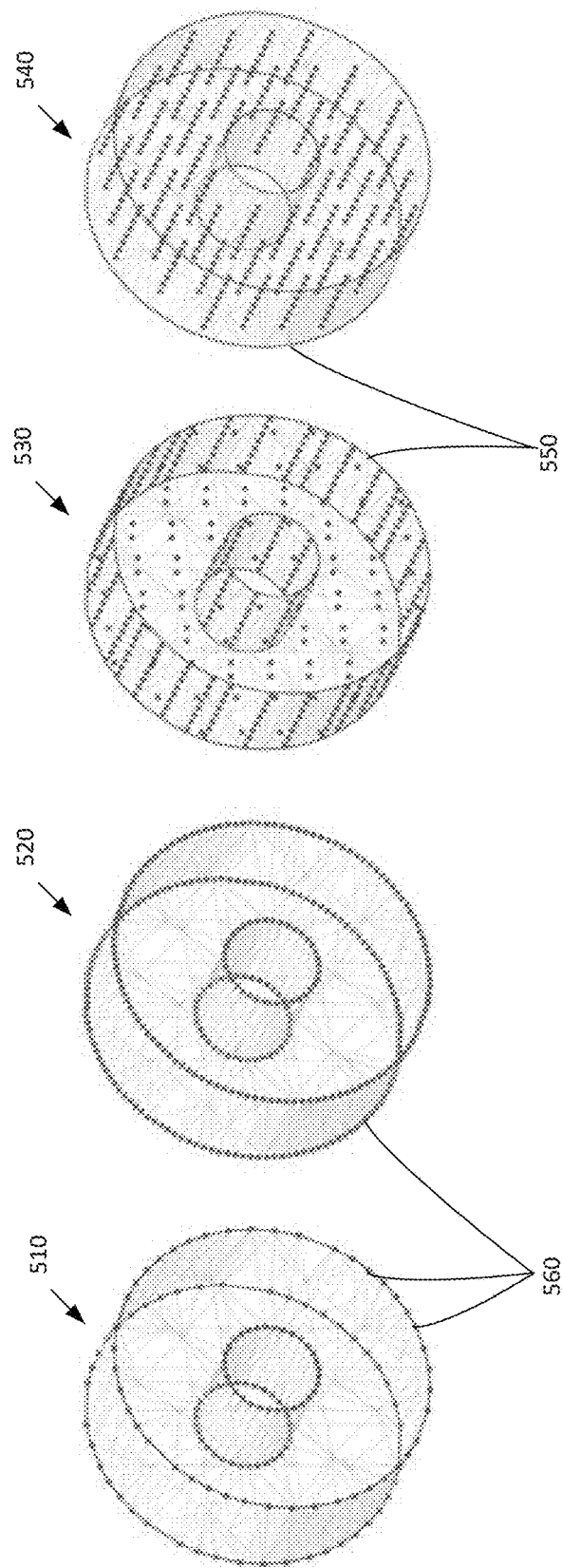
FIG. 5 shows a conceptual diagram of different sampling methods that can be used for generating nodes for a lattice structure, according to various embodiments of the present invention.

FIG. 5 shows a conceptual diagram of different sampling methods that can be used for generating nodes for a lattice structure, according to various embodiments of the present invention. The examples shown in FIG. 5 include vertex-based sampling 510, edge-based sampling 520, surface-based sampling 530, and volume-based sampling 540. Also shown is a design space 550 that defines a bounding volume within which the entire design solution for the object is to be located. Each sampling method generates a plurality of nodes 560 based on the geometries of the design space 550.

Vertex-based sampling 510 may sample vertices defining the design space 550 if the geometries of the design space 550 includes vertices that can be sampled (e.g. when the design space 550 comprises a polygon). If the design space 550 includes vertices, vertex-based sampling 510 may generate a node 560 at each vertex of the design space 550. The vertices may be filtered, for example, based on pointiness or angle defects.

Edge-based sampling 520 may sample the edges of the design space 550 if the geometries of the design space 550 includes edges that can be sampled (e.g. when the design space 550 comprises a polygon). If the design space 550 includes edges, edge-based sampling 520 may generate nodes 560 along the edges at regular intervals. The edges may be filtered, for example, based on lengths, boundary edges, sharp edges (dihedral angles), etc. Jittering may be applied along the edges to make the nodes stratified samples.

Surface-based sampling 530 may sample the surface of the design space 550 to generate nodes 560 on the surface in an array (such as a 2D grid). Jittering may be applied along the surface to make the nodes stratified samples. Volume-based sampling 540 may sample the volume inside the design space 550 and generate nodes within the volume in an array (such as a 3D grid). A 3D index may be assigned to each grid node. Jittering may be applied in the volume to make the nodes stratified samples.

Figure 6:
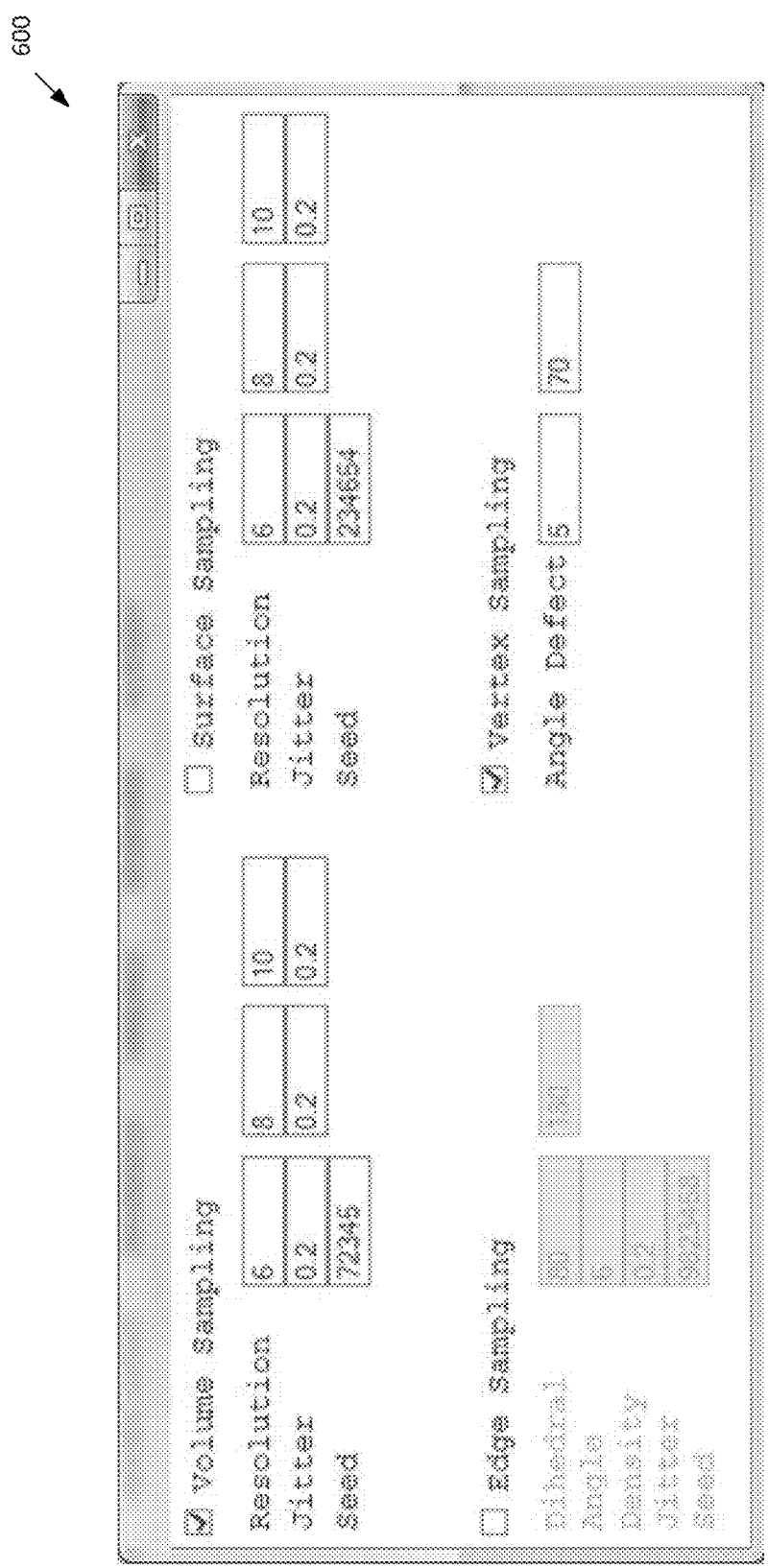
FIG. 6 is a screenshot of a user interface (UI) for selecting different sampling methods and sampling parameters to be used to generate the nodes of a lattice structure, according to various embodiments of the present invention.

In some embodiments, the lattice structure engine 112 provides a user interface (UI) for enabling a user to select (enable/disable) the sampling methods and sampling parameters for each sampling method. FIG. 6 is a screenshot of a user interface (UI) for selecting different sampling methods and sampling parameters to be used to generate the nodes of a lattice structure, according to various embodiments of the present invention. In the example shown, one or more different sampling methods may be enabled (via the UI 600) at the same time (such as the volume-based sampling and vertex-based sampling). Using the UI 600, the user may also select various sampling parameters for each sampling method.

For example, for the volume sampling method, the selectable sampling parameters may include resolution (the size of the 3D grid cells at the centers of which nodes will be sampled), jitter (the maximum extent to which nodes will be displaced randomly along 3 axes, such as 0 for no jitter, +/−1 for jitter that can go as far as, but not necessarily, to the adjacent cell centers along the corresponding axis), and/or seed (the random seed used for computing the jitter). For example, for the surface sampling method, the selectable sampling parameters may include resolution (the size of the 3D grid cells whose centers will be projected onto the surface and sampled as nodes), jitter (the maximum extent to which the nodes will be displaced randomly along 3 axes before projection onto the surface, such as 0 for no jitter, +/−1 for jitter that can go as far as, but not necessarily, to adjacent cell centers along the corresponding axis), and/or seed (the random seed used for computing the jitter). For example, for the edge sampling method, the selectable sampling parameters may include dihedral angle (the valid range of the angle formed by the two faces meeting at an edge, used for measuring local sharpness, in order for the edge to be sampled), density (the distance interval at which the nodes will be sampled along the qualified edges), jitter (the maximum extent to which the sampled nodes will be moved randomly along the edges, such as 0 for no jitter, +/−1 for jitter that can go as far as, but not necessarily, to the unjittered position of an adjacent node), and/or seed (the random seed used for computing the jitter). For example, for the vertex sampling method, the selectable sampling parameters may include angle defect (the valid range of the angle defect at this vertex, used for measuring local pointiness, in order for the vertex to be sampled as a node). In other embodiments, other sampling parameters may be used for the various sampling methods.

As an optional step, after generating the nodes of the lattice structure 110, the lattice structure engine 112 may remove one or more nodes from the lattice structure 110 based on a minimum distance threshold requirement between the nodes. Doing so may remove some of the nodes that are too close together and/or merge some of the nodes that are too close together into a single node to reduce the set of nodes for simplification of the lattice structure 110.

After generating a plurality of nodes based on the defined design space, the lattice structure engine 112 then generates a plurality of lines that interconnect the plurality of nodes to produce the lattice structure 110. The lattice structure engine 112 may generate the lines connecting the nodes according to various connection strategies, such as complete, nearest neighbors, index-based, or random connection strategies.

Figure 7:
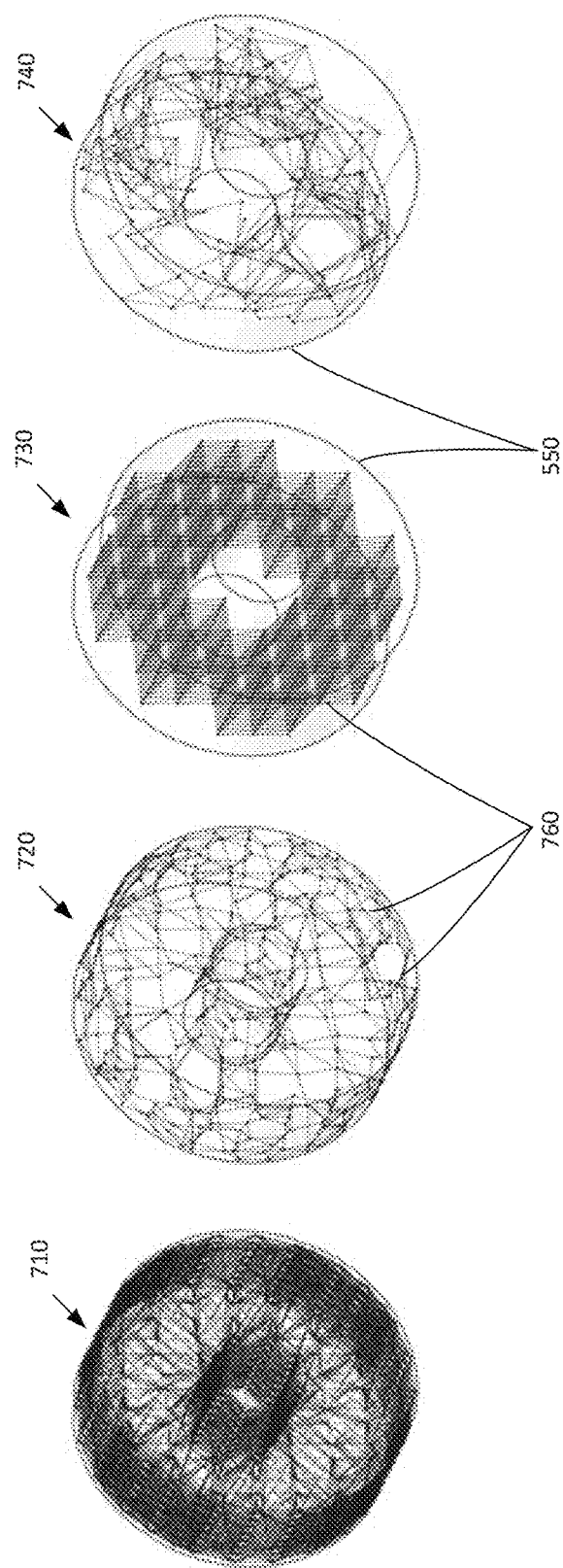
FIG. 7 shows a conceptual diagram of different connection methods that can be used to interconnect the nodes of the lattice structure of FIG. 5, according to various embodiments of the present invention.

FIG. 7 shows a conceptual diagram of different connection methods that can be used to interconnecting the nodes of the lattice structure of FIG. 5, according to various embodiments of the present invention. The examples shown in FIG. 7 include complete connection 710, nearest neighbors connection 720, index-based connection 730, and random connection 740. Also shown is a design space 550 that defines the bounding volume for the object. Each connection method generates a plurality of lines 760 that interconnect nodes of the lattice structure 110.

Complete connection 710 may produce, for each node in the lattice structure 110, lines that connect the node to each and every other node in the lattice structure 110. Nearest neighbors connection 720 may produce, for each node in the lattice structure 110, lines that connect the node to a predetermined limited number of other nodes in the lattice structure 110 that are located closest to the node (so that the node is connected only to its "nearest neighbors").

Index-based connection 730 may produce, for each node in the lattice structure 110, lines that connect the node to other nodes according to a predetermined rule set (such as connecting nodes only along orthogonal lines). Therefore, in index-based connection 730, constraints may be applied to enable or prevent generation of line connections between the nodes. Random connection 740 may produce, for each node in the lattice structure 110, lines that connect the node to one or more other randomly selected nodes in the lattice structure 110.

Figure 8:
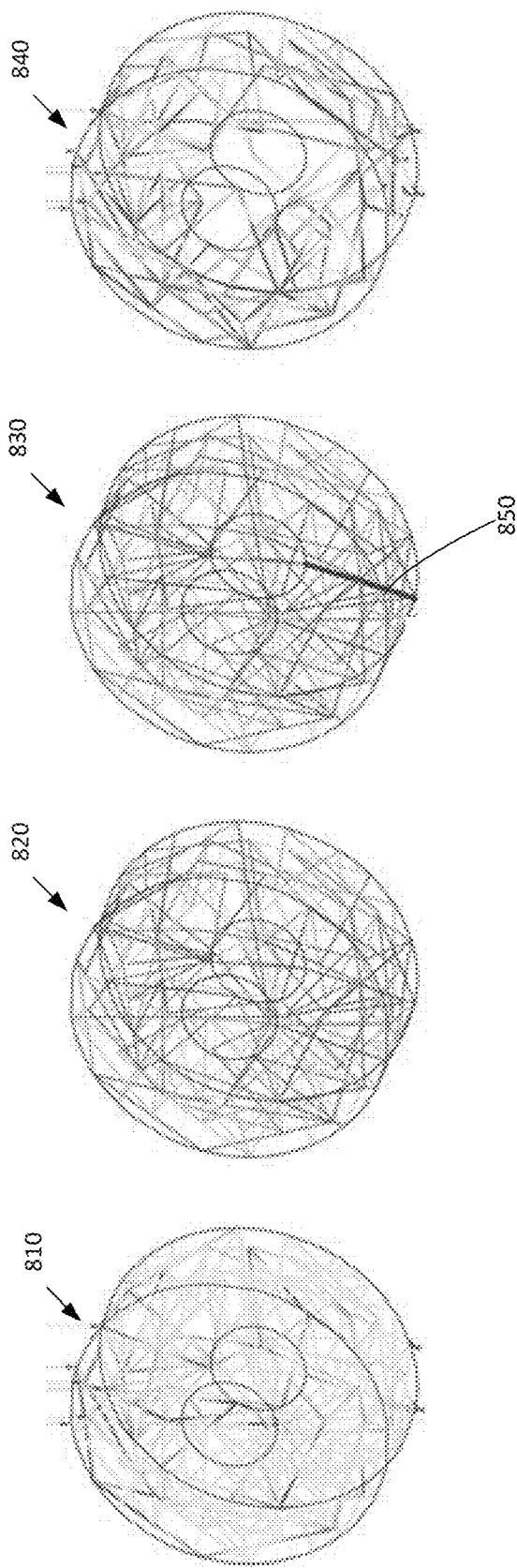
FIG. 8 shows a conceptual diagram of various steps for optimizing the lattice structure of FIG. 5, according to various embodiments of the present invention.

The generation of the nodes and interconnecting lines produces the lattice structure 110. After the lattice structure 110 is generated, the lattice structure engine 112 then processes/optimizes the lattice structure of the object 110 based on at least one load-related requirement (specified in the design problem statement 117) using structural analysis techniques to produce a modified lattice structure 110. Optimization of the lattice structure 110 may include performing a structural analysis of the lattice structure 110 based on at least one load-related requirement, removing one or more lines from the lattice structure 110 based on the structural analysis, and iteratively performing the structural analysis and removing lines from the lattice structure 110 until a termination condition is met to produce the modified lattice structure 110. Thus, optimization of the lattice structure 110 may be used to generate a modified lattice structure 110 with the least amount of lines while maintaining a level of structural performance that satisfies the design problem statement. FIG. 8 shows a conceptual diagram of various steps for optimizing the lattice structure of FIG. 5, according to various embodiments of the present invention.

First, the lattice structure engine 112 performs an initial structural analysis of the lattice structure 110 based on at least one load-related requirement of the design problem statement 117. Each load-related requirement specifying a load-related metric, such as an amount of weight, force, stress, deformation, displacement, or the like. The structural analysis may determine the structural performance of the lattice structure 110 in terms of the specified load-related metric(s). In particular, the structural analysis may determine the contribution of each individual line in the lattice structure 110 to the performance of the lattice structure 110 in meeting the specified load-related metric(s). The contribution of each line may be expressed as a contribution value determined for each specified load-related metric. The lattice structure engine 112 may perform structural analysis of the lattice structure 110 using finite element analysis (FEA) algorithms to create accurate simulations of the application of loads on the lattice structure 110 and the resulting effects (such as stresses, deformations, and displacements) that occur in the lattice structure 110.

FIG. 8 shows an example of the structural analysis step 810 which illustrates the structural performance of a lattice structure 110 in terms of stress and displacement metrics. The structural analysis step 810 may comprise a FEA simulation showing stress and displacement in the individual lines of the lattice structure. The structural analysis step 810 determines how each line contributes to the performance of the lattice structure 110 as a whole in terms of the stress and displacement metrics. For example, different levels of contribution to stress and displacement may be indicated by different colors in the structural analysis step 810.

Using the results of the structural analysis, the lattice structure engine 112 may then sort the lines of the lattice structure 110 based on the contributions of the lines to the overall structural performance of the lattice structure 110 in meeting the specified load-related metric(s). The lines may be sorted from the highest amount of contribution (highest contribution value) to the lowest amount of contribution (lowest contribution value) for each specified load-related metric. FIG. 8 shows an example of the contribution sorting step 820 which illustrates sorting of the lines of the lattice structure 110 based on the contribution to reducing maximum displacement in the lattice structure 110 (from a maximum contribution value to a minimum contribution value). For example, different levels of contribution to stress and displacement may be indicated by different colors in the contribution sorting step 820.

The lattice structure engine 112 may then remove one or more lines of the lattice structure 110 based on the contribution sorting of the lines. The lattice structure engine 112 may remove one or more lines using various removal strategies, such as deterministic or non-deterministic strategies. When using the deterministic strategy, the lattice structure engine 112 may remove the line with the lowest contribution to performance. When using the non-deterministic strategy, the lattice structure engine 112 may remove one or more lines having the N lowest contributions to performance in a random process (e.g., randomly remove one or more lines among such N lines), N comprising an integer value greater than 1. For example, the lattice structure engine 112 may remove one or more lines having the 10 lowest contributions to performance, the one or more lines being randomly selected from the 10 lines having the 10 lowest contributions. Performing the removal step allows removal of lines from the lattice structure 110 that are not contributing much to the overall performance of the lattice structure 110. Removal of such lines results in the reduction of the weight of the final manufactured object without losing much performance. FIG. 8 shows an example of the removal step 830 which illustrates removal of a line 850 using the deterministic strategy. As shown, the line 850 with the minimum contribution toward performance is selected for removal from the lattice structure 110.

The lattice structure engine 112 then iteratively performs the structural analysis (to determine performance contributions of the lines), sorting of the lines (based on contribution), and removing of one or more lines from the lattice structure 110 (based on contribution) until a termination condition is met. FIG. 8 shows an example of the final step 840 which illustrates the lattice structure 110 after the termination condition is met and the iterative process has stopped to produce the modified lattice structure 110. Note that the modified lattice structure 110 in the final step 840 comprises a substantially fewer number of lines that the lattice structure 110 shown in the initial structural analysis step 810.

The termination condition may be determined from the design requirements specified in the design problem statement 117. For example, the design problem statement 117 may specify a maximum weight and a minimum performance (in terms of one or more specified load-related metrics) for the object. In this example, the iterative process may continue until either the maximum weight for the object is reached or the minimum performance (e.g., stress or displacement levels) is reached. If, for example, the design problem statement 117 further specifies that performance is prioritized over weight, the iterative process may continue until the maximum weight for the object is reached. If, for example, the design problem statement 117 further specifies that weight is prioritized over performance, the iterative process may continue until the minimum performance for the object is reached.

Figure 9:
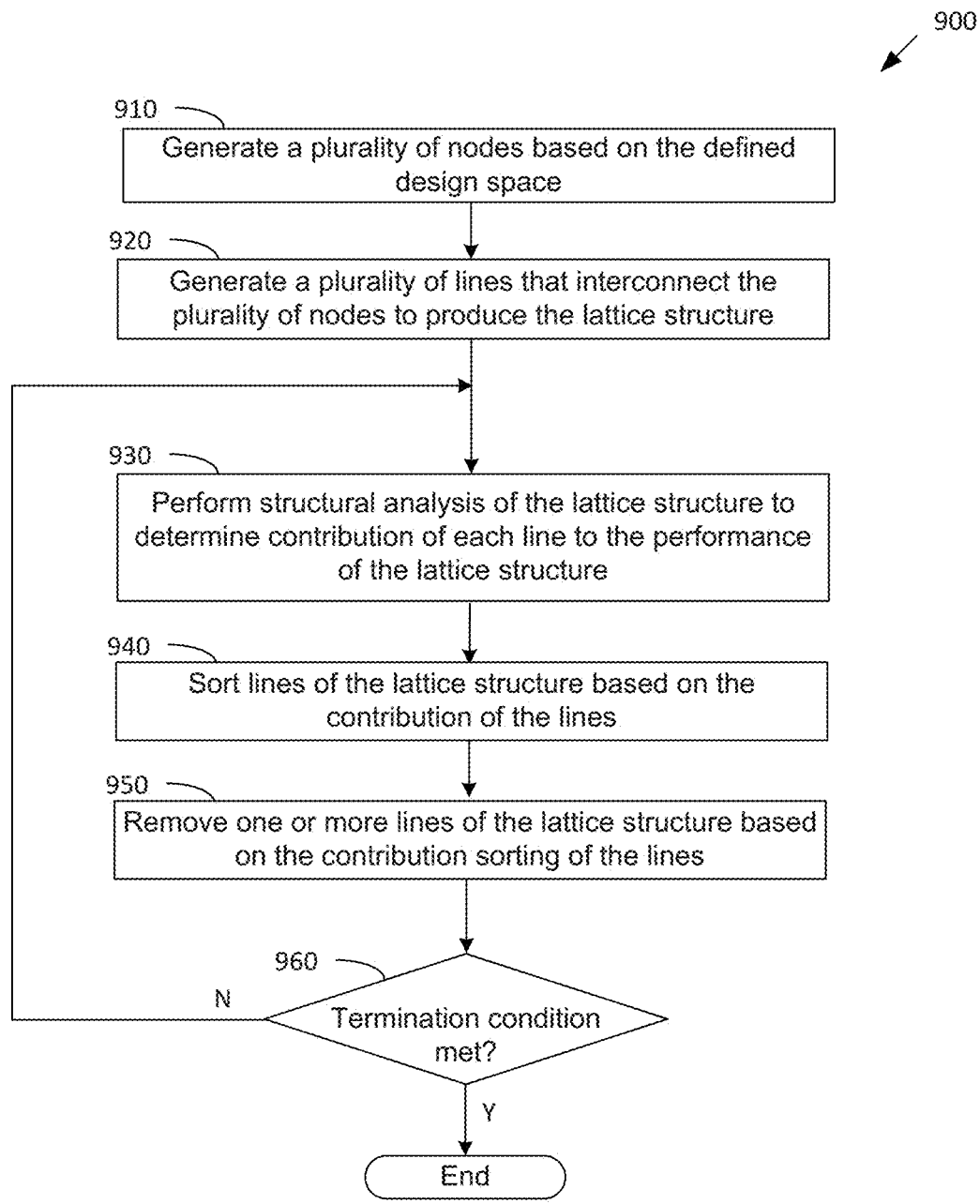
FIG. 9 illustrates a flow diagram of method steps for generating a lattice structure for an object, according to various embodiments of the present invention.

FIG. 9 illustrates a flow diagram of method steps for generating a lattice structure for an object, according to various embodiments of the present invention. Although the method steps are described in conjunction with the systems of FIGS. 1-3 and 5-8, persons skilled in the art will understand that any system configured to perform the method steps, in any order, is within the scope of the invention. In some embodiments, the method 900 may be performed when the lattice structure engine 112 is executed by the processor 102.

As shown, the method 900 may comprise step 420 of the method 400 of FIG. 4. As discussed above, the method 400 receives (at step 410) a design problem statement 117 for an object, the design problem statement 117 comprising a set design requirements and a definition of the design space (bounding volume) for the object. In some embodiments, the design problem statement 117 includes at least one load-related requirement that specifies a load-related metric to be satisfied by the design solutions (such as metrics related to weight, force, stress, deformation, displacement, and the like).

The lattice structure engine 112 generates (at 910) a plurality of nodes for the lattice structure 110 based on geometries of the defined design space. The lattice structure engine 112 may generate the node points within the defined design space according to various sampling methods, such as vertex-based, edge-based, surface-based, and volume-based sampling. One or more sampling methods may be selected by a user, along with one or more parameters for each sampling method (e.g., as selected through a UI 600).

The lattice structure engine 112 then generates (at 920) a plurality of lines that interconnect the plurality of nodes to produce the lattice structure 110. The lattice structure engine 112 may generate the lines connecting the nodes according to various connection strategies, such as complete, nearest neighbors, index-based, or random connection strategies.

The lattice structure engine 112 then processes/optimizes (at steps 930-960) the lattice structure 110 based on the at least one load-related requirement using structural analysis techniques to produce a modified lattice structure 110. The lattice structure engine 112 performs (at step 930) a structural analysis of the lattice structure 110 to determine the structural performance of the lattice structure 110 in terms of the specified load-related metric(s). For each line in the lattice structure 110, the structural analysis may determine a contribution value of the line to the performance of the lattice structure 110 in meeting the specified load-related metric(s).

The lattice structure engine 112 then sorts (at step 940) the lines of the lattice structure 110 based on the contribution values of the lines. The lattice structure engine 112 then removes (at step 950) one or more lines of the lattice structure 110 based on the contribution sorting of the lines. The lattice structure engine 112 may remove one or more lines using various removal strategies, such as deterministic or non-deterministic strategies.

The lattice structure engine 112 then determines (at step 960) whether a termination condition is met. The termination condition may be determined from the design requirements of the design problem statement 117 (such as a maximum weight and/or minimum performance specified in terms of one or more specified load-related metrics). If the termination condition is not met, the method 900 continues at step 930 to iteratively perform structural analysis, sorting of lines, and removal of lines until the termination condition is met and the modified lattice structure 110 is produced. If the termination condition is met, the method 900 ends.

Note that in generating and processing/optimizing the lattice structure 110 to produce the modified lattice structure 110, several design options are provided to the user. For example, to generate the nodes for the lattice structure 110, different sampling methods may be selected by the user (such as vertex-based, edge-based, surface-based, and volume-based sampling), as well as different parameters for each sampling method. To generate the lines interconnecting the nodes for the lattice structure 110, different connection strategies may be selected by the user (such as complete, nearest neighbors, index-based, or random connection strategies). To remove lines from the lattice structure 110, different removal strategies may be selected by the user (such as deterministic or non-deterministic strategies). Thus, different design options and different combinations of design options are provided to the user which each produce different lattice structures 110. Each different lattice structure 110 ultimately results in a different 3D model of the object comprising a different design solution for the design problem statement 117. By providing a wide variety of different design options and combinations thereof, the user can explore a wide variety of possible design solutions for the same design problem statement 117.

In addition, the generation and optimization of the lattice structure 110 involves the modeling of 2D elements (lines) rather than the 3D modeling of a 3D volume, which is significantly more time and resource intensive. While a 3D model of the object 120 is later generated based on the lattice structure 110, a substantial portion of the design process may be performed using the lattice structure 110 (rather than the 3D model 120), thus providing a more efficient design process for an object using structural analysis.

Generating a 3D Model of the Object

After the lattice structure engine 112 generates and processes/optimizes the lattice structure of the object 110 to produce the modified lattice structure 110, the 3D model engine 115 then generates a 3D model of the object 120 based on the modified lattice structure of the object 110. In general, the 3D model 120 is generated by thickening each line of the lattice structure 110 into a "pipe" so that each line has a diameter and volume. The 3D model engine 115 then merges the resulting pipes to form a unified 3D volume structure comprising a 3D model 120 that represents the volume of the object. As a final step, the 3D model engine 115 may perform shape optimization of the 3D model 120 before exporting to a fabrication device 160 for fabrication.

First, the 3D model engine 115 may determine the diameter and volume (thickness) of each pipe based on at least one load-related metric (specified in the design problem statement 117) using structural analysis of the modified lattice structure 110. The 3D model engine 115 performs structural analysis on the modified lattice structure 110 to determine the value of a load-related metric associated with each line in the lattice structure 110. For example, the 3D model engine 115 may determine the amount of load or stress on each line in the lattice structure 110.

The 3D model engine 115 then generates a pipe for each line in the lattice structure 110 having a diameter and volume that is determined by the value of the load-related metric associated with the line/pipe. For example, the 3D model engine 115 may determine the diameter and volume (thickness) of each pipe based on the load or stress on the particular pipe. As such, a higher amount of load or stress on a pipe produces a thicker pipe with a greater diameter and volume (as compared to a lower load or stress on the pipe which produces a thinner pipe with a smaller diameter and volume). For example, the 3D model engine 115 may implement a voxel-based nearness algorithm or a marching cube remeshing algorithm to thicken the lines of the lattice structure 110 into pipes based on the load or stress on the pipe. In this manner, the 2D elements (lines) of the lattice structure 110 are converted to 3D volume elements (pipes).

After determining the pipe thickness of each line in the lattice structure 110, the 3D model engine 115 then merges the resulting pipes to form a single unified 3D volume structure. The unified 3D volume structure comprises a 3D model of the object 120 that represents the volume of the object. As discussed above, FIG. 3 shows a conceptual diagram of a 3D model of an object 120. As shown, the 3D model 120 comprises a plurality of pipes 310 that have been merged to form a single unified 3D volume structure. Each pipe 310 may comprise a line in the lattice structure 110 that has been thickened to comprise a diameter and volume.

In general, different strategies may be used for determining the pipe thickness of each line and merging the resulting pipes to form a single unified 3D volume structure. For example, one strategy may comprise first creating the pipes as individual pipe objects using, for example, either a non-uniform rational basis spline (NURBS) model (used in computer graphics for generating and representing curves and surfaces) or a mesh geometry using existing CAD tools and methods. The resulting pipes can then be merged to form a single volume using boolean addition operations, which is a standard feature of CAD systems and can be performed with either NURBS or mesh geometry. As discussed above, another strategy may comprise using a volumetric, voxel-based geometry, whereby each line is assigned a value specifying the thickness of the resulting pipe around it. The voxels are then turned on or off based on whether they are within the specified distance of any of the lines. A marching cubes algorithm may then be used to convert the resulting voxel model into a smooth polygonal surface mesh.

As a final step, the 3D model engine 115 may perform shape optimization to further refine the 3D model of the object 120 before exporting the 3D model 120 to a fabrication device 160. Shape optimization may include fine tuning and calibration of the shape/geometry of the unified 3D volume structure for exporting to a fabrication device 160 by "pushing" (contracting/reducing) and/or "pulling" (expanding/increasing) particular areas of the geometry of the unified 3D volume structure. For example, the 3D model engine 115 may perform shape optimization by implementing different geometric representations of the unified 3D volume structure, such as mesh-based, voxel-based, or level set-based geometric representations. For example, for a surface-mesh based representation, the model may be smoothed to reduce surface irregularities resulting from the process of combining pipes into a single mesh. In this case the vertices of the mesh are pushed and pulled relative to local mesh normal such that the internal volume of the mesh is kept constant while the surface area is minimized. For example, for a volumetric representation (including voxel-based, volumetric mesh, or level-set representations), the final model can be subjected to known topology optimization algorithms that can further refine the final shape of the model. As described earlier, these algorithms are able to reduce material in areas of low stress, and add material in areas of high stress. In this case, the topology optimization would only provide a small level of final refinement, and would not substantially change the topology of the final design.

The resulting 3D model 120 comprises a design solution for the design problem statement 117 which meets all design requirements (including at least one load-related requirement) specified in the design problem statement 117. Since the process results in a well-defined and optimized surface mesh, the 3D model 120 also comprises a "workable solution" that is ready for exporting to a fabrication device 160 (in contrast to known topology optimization methods). The fabrication device 160 may manufacture a physical object based on the 3D model 120.

Figure 10:
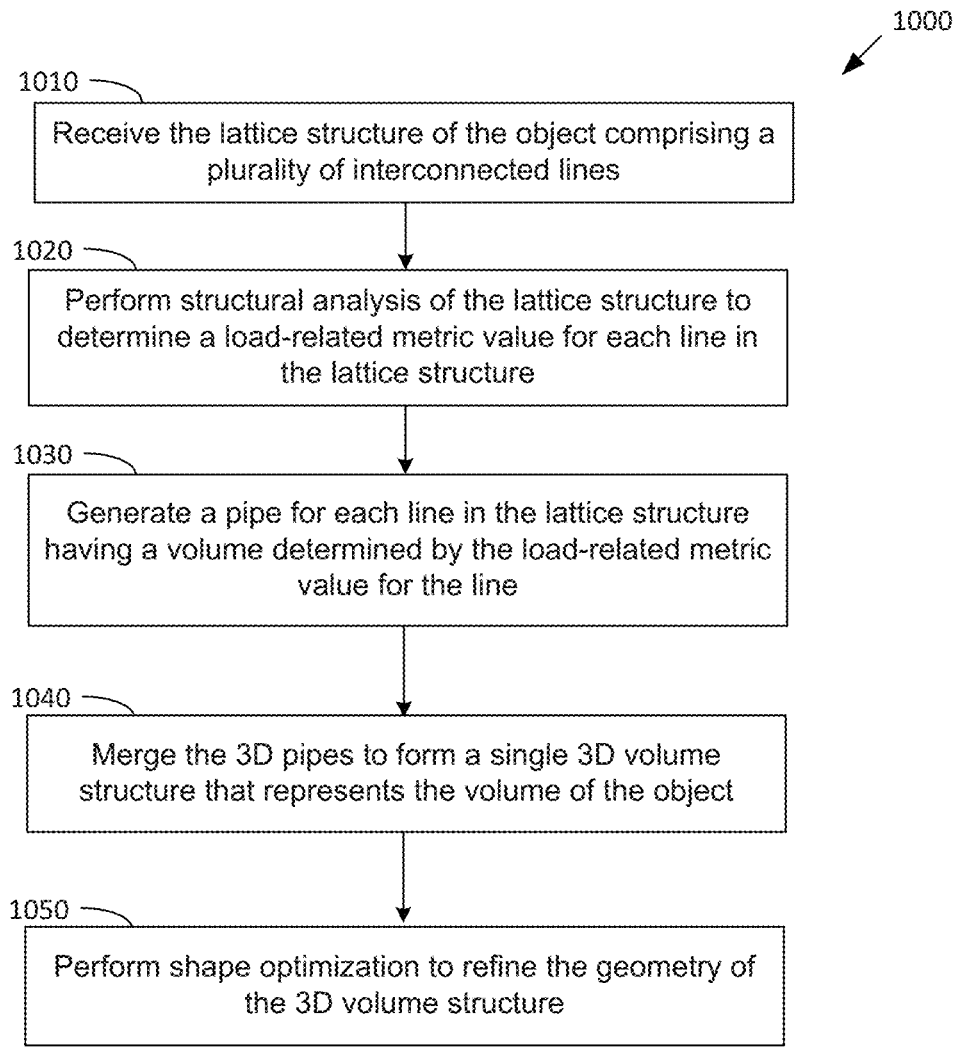
FIG. 10 illustrates a flow diagram of method steps for generating a 3D model for an object, according to various embodiments of the present invention.

FIG. 10 illustrates a flow diagram of method steps for generating a 3D model for an object, according to various embodiments of the present invention. Although the method steps are described in conjunction with the systems of FIGS. 1-3 and 5-8, persons skilled in the art will understand that any system configured to perform the method steps, in any order, is within the scope of the invention. In some embodiments, the method 1000 may be performed when the 3D model engine 115 is executed by the processor 102 and may comprise step 430 of the method 400 of FIG. 4.

As shown, the method 1000 begins when the 3D model engine 115 receives (at step 1010) the modified lattice structure of the object 110 from the lattice structure engine 112. The 3D model engine 115 then performs (at step 1020) structural analysis of the lattice structure 110 to determine the value of at least one load-related metric (specified in the design problem statement 117) associated with each line in the lattice structure 110. For example, the 3D model engine 115 may determine the amount of load or stress on each line in the lattice structure 110.

The 3D model engine 115 then generates (at step 1030) a 3D pipe for each 2D line in the lattice structure 110, the pipe having a diameter and volume determined by the value of the load-related metric associated with the line/pipe. For example, the 3D model engine 115 may determine the diameter and volume (thickness) of each pipe based on the load or stress on the particular line/pipe. The 3D model engine 115 then merges (at step 1040) the 3D pipes to form a single unified 3D volume structure that represents the volume of the object. The 3D model engine 115 performs (at step 1050) shape optimization to refine the geometry of the unified 3D volume structure to produce an exportable 3D model of the object 120. The method 1000 then ends.

In sum, a design engine 108 may be used to receive a design problem statement for an object and produce at least one design solution that meets all design requirements (including at least one load-related requirement) of the design problem statement. The design engine 108 may do so by first generating and optimizing a lattice structure of the object 110 using a lattice structure engine 112. The lattice structure engine 112 may generate the lattice structure 110 by generating a plurality of nodes and then generating a plurality of lines that interconnect the nodes. The lattice structure engine 112 may then optimize the lattice structure 110 using structural analysis based on the at least one load-related requirement. The lattice structure engine 112 provides several design options for generating and optimizing the lattice structure 110. The design engine 108 may then generate a 3D model of the object 120 based on the lattice structure 110 using the 3D model engine 115. The 3D model engine 115 may generate the 3D model 120 by thickening each line of the lattice structure 110 into a pipe volume. The 3D model of the object 120 comprises a design solution that satisfies all design requirements of the design problem statement and is exportable to a fabrication device.

At least one advantage of the disclosed technique is that several design options are provided to explore a wide space of design solutions for a given design problem statement. Another advantage of the disclosed technique is that designing of the lattice structure of the object involves the modeling of 2D elements (lines) rather than the 3D modeling of a 3D volume, which is significantly more time and resource intensive. Thus, a substantial portion of the design process may be performed using the lattice structure 110 (rather than the 3D model 120) to provide a more efficient design process for an object using structural analysis. A third advantage of the disclosed technique is that the resulting model can be easily prepared for ALM without intensive manual processing.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowcharts and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for designing a physical object via a computer-aided design application, the method comprising:
    generating a lattice structure that represents the physical object and includes a plurality of interconnected lines;
    processing the plurality of interconnected lines included in the lattice structure using structural analysis of the lattice structure based on at least one load-based design requirement to produce a modified lattice structure that includes a second plurality of interconnected lines;
    generating a three-dimensional (3D) model based on the modified lattice structure that represents a volume of the physical object; and
    causing a first physical object to be fabricated by a fabrication device based on the 3D model.

2. The computer-implemented method of claim 1, wherein the load-based design requirement specifies a load-related metric to be satisfied by the 3D model.

3. The computer-implemented method of claim 2, wherein the load-related metric comprises weight, force, stress, deformation, or displacement.

4. The computer-implemented method of claim 1, wherein each line of the lattice structure comprises a different two-dimensional (2D) element.

5. The computer-implemented method of claim 1, wherein generating the lattice structure comprises:
    generating a plurality of nodes based on a design space defined for the physical object; and
    generating a plurality of lines that interconnect the plurality of nodes.

6. The computer-implemented method of claim 1, wherein processing the plurality of interconnected lines included in the lattice structure comprises removing one or more lines from the plurality of interconnected lines based on the structural analysis of the lattice structure.

7. The computer-implemented method of claim 1, wherein generating the 3D model of the physical object comprises converting each line in the lattice structure into a 3D pipe element having a volume.

8. The computer-implemented method of claim 1, further comprising receiving a design problem statement that specifies a plurality of design requirements for the physical object and a design space definition for the physical object.

9. The computer-implemented method of claim 1, further comprising exporting the 3D model of the physical object to a fabrication device.

10. A non-transitory computer-readable medium storing program instructions that, when executed by a processor, cause the processor to design physical object by performing the steps of:
    generating a lattice structure that represents the physical object and includes a plurality of interconnected lines;
    processing the plurality of interconnected lines included in the lattice structure using structural analysis of the lattice structure based on at least one load-based design requirement to produce a modified lattice structure that includes a second plurality of interconnected lines;
    generating a three-dimensional (3D) model based on the modified lattice structure that represents a volume of the physical object; and
    causing a first physical object to be fabricated by a fabrication device based on the 3D model.

11. The non-transitory computer-readable medium of claim 10, wherein each line of the lattice structure comprises a different two-dimensional (2D) element.

12. The non-transitory computer-readable medium of claim 10, wherein generating the lattice structure comprises:
    generating a plurality of nodes based on a design space defined for the physical object; and
    generating a plurality of lines that interconnect the plurality of nodes.

13. The non-transitory computer-readable medium of claim 12, wherein generating the plurality of nodes comprises sampling the design space via a vertex-based sampling technique, an edge-based sampling technique, a surface-based sampling technique, or a volume-based sampling technique.

14. The non-transitory computer-readable medium of claim 12, wherein generating the plurality of lines comprises generating the plurality of lines using a complete connection strategy, a nearest neighbors connection strategy, an index-based connection strategy, or a random connection strategy.

15. The non-transitory computer-readable medium of claim 10, wherein processing the plurality of interconnected lines included in the lattice structure comprises removing one or more lines from the plurality of interconnected lines based on the structural analysis of the lattice structure.

16. The non-transitory computer-readable medium of claim 10, wherein generating the 3D model of the physical object comprises converting each line in the lattice structure into a 3D pipe element having a volume.

17. The non-transitory computer-readable medium of claim 16, wherein generating the 3D model of the physical object further comprises performing one or more structural analysis operations on the lattice structure based on the at least one load-based design requirement to determine the volume of each 3D pipe object within the 3D model.

18. The non-transitory computer-readable medium of claim 16, wherein generating the 3D model of the physical object further comprises merging the plurality of 3D pipe objects to form a single 3D object.

19. A system configured for designing physical object, comprising:

a memory that includes a design engine; and
a processor that is coupled to the memory and, upon executing the design engine, is configured to:
   generate a lattice structure that represents the physical object and includes a plurality of interconnected lines;
   process the plurality of interconnected lines included in the lattice structure using structural analysis of the lattice structure based on at least one load-based design requirement to produce a modified lattice structure that includes a second plurality of interconnected lines;
   generate a three-dimensional (3D) model based on the modified lattice structure that represents a volume of the physical object; and
   cause a first physical object to be fabricated by a fabrication device based on the 3D model.

20. The system of claim 19, wherein each line of the lattice structure comprises a different two-dimensional (2D) element.

* * * * *